United States Patent [19]

Vian et al.

[11] 4,073,512
[45] Feb. 14, 1978

[54] QUICK CONNECT DEVICE FOR AUTO RADIATORS

[75] Inventors: David Roy Vian, Rialto; Stephen Glenn Price, Riverside, both of Calif.

[73] Assignee: Hayden Trans-Cooler, Inc., Oakland, Calif.

[21] Appl. No.: 748,902

[22] Filed: Dec. 9, 1976

[51] Int. Cl.² ............................................. F16L 25/00
[52] U.S. Cl. ................................. 285/12; 285/176; 285/334.5; 285/386
[58] Field of Search ................. 285/334.5, 12, 353, 285/356, 177, 354, 386, 175, 176, 384, 393

[56] References Cited

U.S. PATENT DOCUMENTS

| | | | |
|---|---|---|---|
| 931,128 | 8/1909 | Keith | 285/356 X |
| 1,584,394 | 5/1926 | Munley | 285/356 X |
| 1,872,536 | 8/1932 | Weatherhead | 285/356 X |
| 2,545,168 | 3/1951 | Richardson | 285/334.5 X |
| 2,685,461 | 8/1954 | Mueller | 285/354 X |

FOREIGN PATENT DOCUMENTS

| | | | |
|---|---|---|---|
| 1,191,066 | 4/1969 | France | 285/12 |

*Primary Examiner*—Dave W. Arola
*Attorney, Agent, or Firm*—Harris Zimmerman

[57] ABSTRACT

A device for connecting an auxiliary oil cooler to an existing automobile oil cooling radiator includes a length of tubing having a flared portion at each end. Slidably secured about the tube is a fitting which includes an exterior hex portion for engagement by a wrench, and an exterior threaded portion which is adapted to be secured in a standard, threaded female radiator fitting. The fitting of the invention also includes an interior threaded portion which is adapted to be secured about a standard male radiator fitting.

1 Claim, 7 Drawing Figures

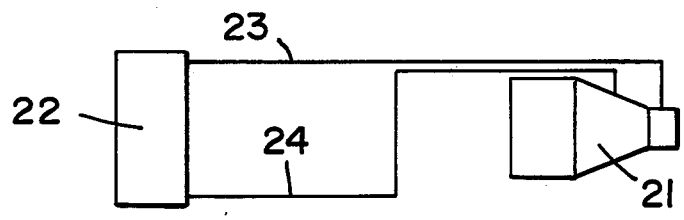
FIG_1
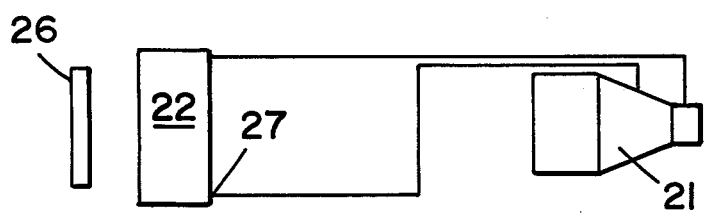
FIG_2
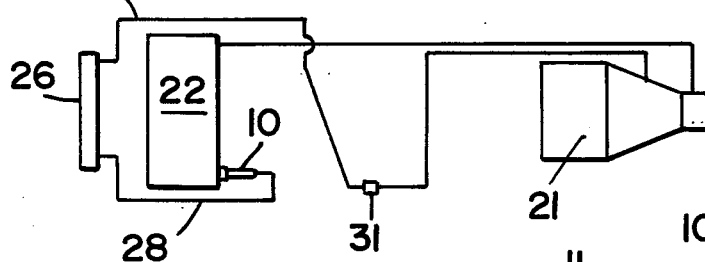
FIG_3
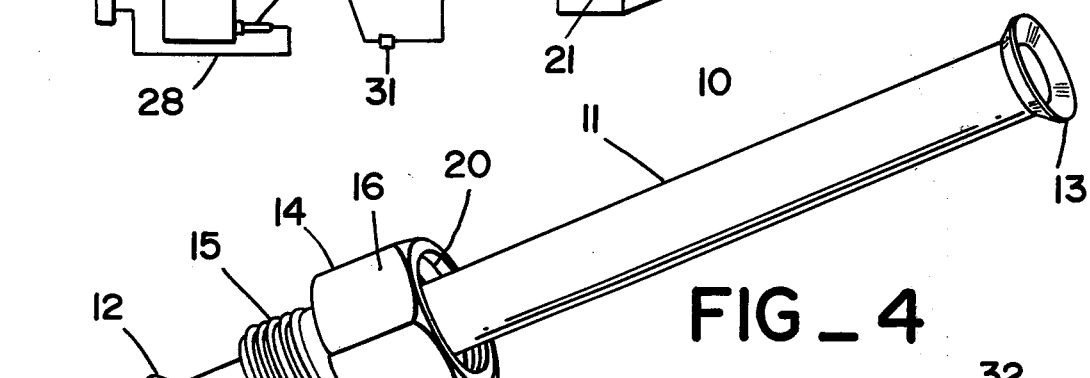
FIG_4
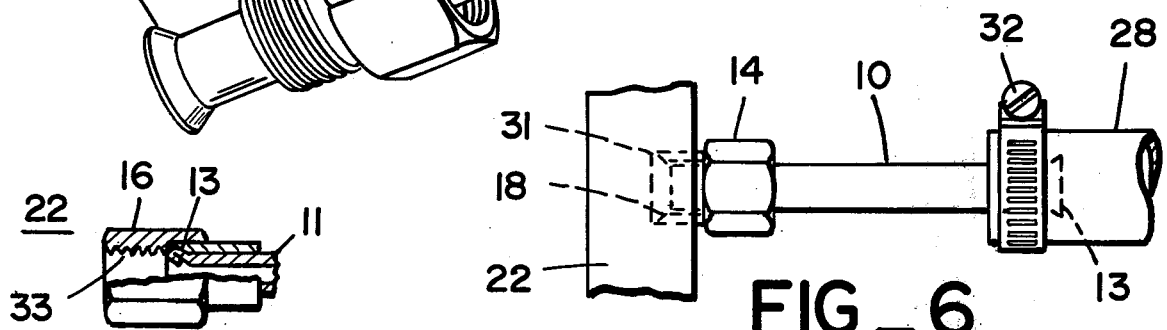
FIG_6
FIG_7
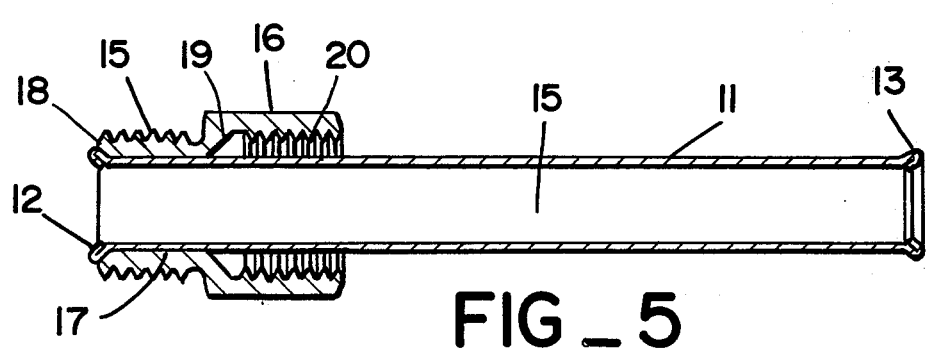
FIG_5

QUICK CONNECT DEVICE FOR AUTO RADIATORS

BACKGROUND OF THE INVENTION

In automobiles, light trucks, recreational vehicles and the like which are occasionally required to haul heavy loads, it is often found that despite the original equipment cooling systems provided for the transmission, the transmission overheats. It is known in the art to provide additional cooling for the transmission oil with the addition of an auxiliary oil cooler adjacent to the existing radiator. One such system for this purpose is described in U.S. Pat. No. 3,315,464, issued to Perez Hayden on Apr. 25, 1967.

Experience has shown that in installing any of these auxiliary oil cooler systems, it is often required to cut the steel tubing which conducts oil between the transmission and the existing oil cooling radiator. Also, since the auxiliary oil cooler is to be connected to the cut steel tubes with hose and hose clamps, it is necessary to flare and deburr the newly cut ends of the steel tubing to provide secure attachment of the hoses. The cutting and flaring tools for these procedures are generally not available to a home mechanic; thus the auxiliary oil cooler could not be properly installed by a do-it-yourself mechanic, and would not be purchased by such an individual.

Experience has shown that the steel tubing is attached to the existing oil cooling radiator by either a male flare tube fitting, or a female flare tube fitting, thus; it has been impractical to provide adaptor fittings because two were required, with one being a throwaway part.

SUMMARY OF THE INVENTION

The present invention generally comprises a device for connecting an auxiliary oil cooler for a vehicle to the existing oil tubing and radiator without necessitating cutting and flaring the existing oil tubing. The device is adapted to be secured to either the standard female or the standard male radiator fitting, thereby economizing on parts and material.

The invention includes a length of tubing which is flared at each end and is approximately equal in diameter to the existing oil line to the radiator. An adaptor fitting is slidably disposed on the tubing, and includes a tapered bore at one end which is adapted to engage one flared end of the tube. The same one end of the fitting includes an externally threaded portion which is adapted to be secured in a standard female threaded radiator fitting.

Adjacent to the externally threaded portion of the adapter is a hex-sided portion which is provided for engagement by a standard wrench. Within the hex portion the bore of the fitting is threaded so that it may be secured about a standard male radiator fitting. The interior terminus of the threaded portion is provided with a taper which is adapted to engage the flared portion of the other end of the tube.

THE DRAWING

FIG. 1 is a schematic diagram of a typical original vehicle transmission oil cooling system.

FIG. 2 is a schematic diagram as in FIG. 1, with the system partially disconnected for installation of an auxiliary cooling system.

FIG. 3 is a schematic diagram as in FIG. 2, with the auxiliary cooling system installed.

FIG. 4 is a perspective view of the coupling device of the present invention.

FIG. 5 is a longitudinally sectioned view of the coupling device of the present invention.

FIG. 6 is a plan view of the coupling device of the present invention, shown in use in conjunction with a radiator.

FIG. 7 is a partially sectioned detailed view of a portion of the present invention.

DESCRIPTION OF THE PREFERRED EMBODIMENT

The present invention generally comprises a device 10 for quickly and securely connecting an auxiliary oil cooling system to an existing vehicle transmission oil cooling system. As shown in particular in FIGS. 4 and 5, the device includes a tube 11 having a hollow interior bore 15 for conducting oil therethrough. The ends 12 and 13 of the tube are flared outwardly, and the outer periphery is crimped back inwardly on itself to provide a smooth distal edge to the flared ends. Alternatively, a standard single flare may be used so long as the edge is properly deburred.

The device of the present invention also includes an adaptor coupling 14 which includes a bore 17 extending therethrough. The tube 11 is slidably received through the bore, the flared ends 12 and 13 retaining the coupling on the tube. One end of the bore of the adapter coupling is provided with an outwardly flared end 18 extending at substantially the same angle as described by the flared ends 12 and 13 of the tube. Adjacent to the flared end 18, the coupling is provided with an externally threaded portion 15. These threads are ½ - 20 pitch, the thread size which is standard for female threaded vehicle radiator fittings.

Adjacent to the threaded portion 15, the adapter fitting is provided with a hex-sided portion 16 which is adapted to be engaged by a standard box, open end, or adjustable wrench. Within the hex-sided portion 16 of the fitting the bore 20 is widened and provided with ½ - 20 pitch internal threads, which is standard for male threaded vehicle radiator fittings. The transition between the bore portions 17 and 20 is provided by the chamfer 19 which extends at the same angle as the flared end 13 of the tube 11.

The device of the present invention is intended for use in connecting an auxiliary oil cooling system to an existing oil cooling system in a vehicle. As shown in FIG. 1, an original equipment oil cooling system generally comprises a transmission 21, an oil cooling radiator 22, a pipe or tube 23 for conducting the transmission oil to the radiator, and a return line 24 for conducting the oil back to the transmission. To install an auxiliary cooler 26, it is first secured adjacent to the existing radiator in the airstream of the vehicle fan or the airstream of the moving vehicle. The return line 24 is then disconnected from the radiator 22, as shown at 27 in FIG. 2.

The device 10 of the present invention is then secured to the radiator 22, and an oil line 28 is secured with clamps to the device 10 and to the auxiliary cooler 26. An oil line 29 is then connected from the cooler 26 to the disconnected end of the line 24 by clamp 31, to complete the hydraulic circuit and to cause the transmission oil to flow through both the original radiator 22 and the auxiliary cooler 26.

Shown by way of example in FIG. 6 is a radiator 22 having a female connector 31. The device 10 is secured thereto by aligning the device with the threaded coupling end 15 toward the connector, and inserting the end 12 of the tube into the connector 31. The coupling is then threaded into the connector, the flared portion 18 impinging on the flared portion 12 of the tube and providing a leakproof seal. The end 13 of the tube is then inserted in the end of line 28 and secured thereto by a screw clamp 32. The flared portion 13 provides purchase for the clamp.

As shown in FIG. 7, the device 10 is adapted to be secured to a male connector 33 of a radiator 22. In this case, the device is aligned so that the threaded interior portion 20 and the flared end 13 confront the connector. The coupling is then threadedly secured to the connector 33, the flared portion 13 of the tube impinging on the end thereof. The coupling and the tube thus form a leakproof seal with the connector, and the end 12 of the tube is available for securing the line 28 thereto.

We claim:
1. A device for connecting a fluid carrying line to either a male or female threaded connector, comprising a tube provided with a flared portion at each end thereof; an adapter coupling having a bore extending therethrough, the diameter of said bore being less than the diameter of said flared portion at each end; said tube being slidably received in said bore and retained therein by said flared end portions; one end of said coupling including an externally threaded portion and a smooth interior bore, the other end of said coupling including an internally threaded portion; a chamfer extending from said smooth interior bore to said internally threaded portion, said chamfer extending at the same angle as the respective flared end portion of said tube; and an outwardly directed taper extending from said smooth interior bore to said one end of said coupling, said taper extending at the same angle as the respective flared end portion of said tube.

* * * * *